(12) United States Patent
Monro

(10) Patent No.: US 7,848,584 B2
(45) Date of Patent: Dec. 7, 2010

(54) REDUCED DIMENSION WAVELET MATCHING PURSUITS CODING AND DECODING

(76) Inventor: Donald M. Monro, 6, The Lays, Goose Street, Beckington, Somerset BA11 6RS (GB)

( * ) Notice: Subject to any disclaimer, the term of this patent is extended or adjusted under 35 U.S.C. 154(b) by 614 days.

(21) Appl. No.: 11/222,665

(22) Filed: Sep. 8, 2005

(65) Prior Publication Data
US 2007/0053597 A1 Mar. 8, 2007

(51) Int. Cl.
G06K 9/36 (2006.01)
G06K 9/46 (2006.01)
(52) U.S. Cl. .................................. 382/240; 382/239
(58) Field of Classification Search .................. None
See application file for complete search history.

(56) References Cited

U.S. PATENT DOCUMENTS

| | | | |
|---|---|---|---|
| 5,315,670 A | 5/1994 | Shapiro | |
| 5,321,776 A | 6/1994 | Shapiro | |
| 5,412,741 A | 5/1995 | Shapiro | |
| 5,495,292 A | 2/1996 | Zhang et al. | |
| 5,585,852 A | 12/1996 | Agarwal | |
| 5,699,121 A | 12/1997 | Zakhor et al. | |
| 5,768,437 A | 6/1998 | Monro et al. | |
| 6,078,619 A | 6/2000 | Monro et al. | |
| 6,148,106 A * | 11/2000 | Impagliazzo | 382/224 |
| 6,532,265 B1 | 3/2003 | Van der Auwera et al. | |
| 6,556,719 B1 | 4/2003 | Monro | |
| 6,587,507 B1 * | 7/2003 | Chui et al. | 375/240.19 |
| 6,614,847 B1 | 9/2003 | Das et al. | |
| 6,633,688 B1 | 10/2003 | Nixon et al. | |
| 6,741,739 B1 | 5/2004 | Vincent | |
| 6,757,437 B1 | 6/2004 | Keith et al. | |
| 6,782,132 B1 | 8/2004 | Fogg | |
| 6,795,504 B1 | 9/2004 | Xu et al. | |
| 6,982,742 B2 * | 1/2006 | Adair et al. | 348/158 |
| 6,990,142 B2 | 1/2006 | Chappaz | |
| 6,990,246 B1 | 1/2006 | Ferguson | |
| 7,003,039 B2 | 2/2006 | Zakhor et al. | |
| 7,006,567 B2 * | 2/2006 | Frossard et al. | 375/240.03 |
| 7,242,812 B2 | 7/2007 | Hwang et al. | |
| 7,336,811 B2 | 2/2008 | Takeo | |
| 7,436,884 B2 | 10/2008 | Chen et al. | |

(Continued)

FOREIGN PATENT DOCUMENTS

WO WO98/11730 3/1998

(Continued)

OTHER PUBLICATIONS

Marusic et al, "A Matching Pursuit Enhanced Three-Dimensional Wavelet Transform Coder", Electrotechnical Conference, 2000. MELECON 2000. 10th Mediterranean, Publication Date: 2000.vol. 2, on pp. 482-485.*

(Continued)

Primary Examiner—Yuzhen Ge
(74) Attorney, Agent, or Firm—Perkins Coie LLP

(57) ABSTRACT

Embodiments related to coding and/or decoding data, including for example image data, using wavelet transform and matching pursuits are disclosed. In some embodiments, a wavelet transform is applied to data to produce transformed data. The transformed data is scanned to produce reduced dimension data, and a matching pursuit is performed in the reduced dimension data.

29 Claims, 13 Drawing Sheets

U.S. PATENT DOCUMENTS

| | | | |
|---|---|---|---|
| 7,447,631 | B2 | 11/2008 | Truman et al. |
| 7,548,656 | B2 | 6/2009 | Nakajima et al. |
| 2003/0103523 | A1* | 6/2003 | Frossard et al. ............. 370/465 |
| 2004/0028135 | A1 | 2/2004 | Monro |
| 2004/0126018 | A1 | 7/2004 | Monro |
| 2004/0165737 | A1 | 8/2004 | Monro |
| 2005/0084014 | A1* | 4/2005 | Wang et al. ............ 375/240.19 |
| 2006/0013312 | A1 | 1/2006 | Han |
| 2006/0146937 | A1 | 7/2006 | Ye et al. |
| 2006/0203906 | A1 | 9/2006 | Divorra Escoda et al. |
| 2007/0052558 | A1 | 3/2007 | Monro |
| 2007/0053434 | A1 | 3/2007 | Monro |
| 2007/0053597 | A1 | 3/2007 | Monro |
| 2007/0053603 | A1 | 3/2007 | Monro |
| 2007/0065034 | A1 | 3/2007 | Monro |
| 2007/0081593 | A1 | 4/2007 | Jeong et al. |

FOREIGN PATENT DOCUMENTS

| | | |
|---|---|---|
| WO | WO99/08449 | 2/1999 |
| WO | WO01/15456 | 3/2001 |
| WO | WO01/63935 | 8/2001 |
| WO | WO02/13538 | 2/2002 |
| WO | WO2005/027049 | 3/2005 |
| WO | WO2005/119581 | 12/2005 |
| WO | WO2007/030702 | 3/2007 |
| WO | WO2007/030784 | 3/2007 |
| WO | WO2007/030785 | 3/2007 |
| WO | WO2007/030788 | 3/2007 |

OTHER PUBLICATIONS

U.S. Appl. No. 11/255,090, filed Oct. 19, 2005, Monro.

Monro et al., "Bases for Low Complexity Matching Pursuits Image Coding" www.http://dmsun4.bath.ac.uk.

Yuan et al., "Improved Matching Pursuits Image Coding" IEEE International Conference on Acoustics, Speech and Signal Processing ICASSP 2005, pp. II-201-204, Mar. 2005.

Monro, "Basis Picking for Matching Pursuits Image Coding" IEEE International Conference on Image Processing, pp. 2495-2498, Sep. 2004.

Yuan et al., "Low Complexity Separable Matching Pursuits" IEEE Int. Conference Acoustics Speech Signal Process, pp. III-725-728, May 2004.

Figueras et al., "Color Image Scalable Coding with Matching Pursuit" IEEE Int. Conference Acoustics Speech Signal Process, pp. III-53-56, May 2004.

Monro et al., "Improved Coding of Atoms in Matching Pursuits" IEEE Int. Conf. Image Process, vol. 2, Sep. 2003.

Frossard et al., "High Flexibility Scalable Image Coding" Proceedings of VCIP 2003, Jul. 2003.

Poh et al., "Comparison of Residual Compression Methods in Motion Compensated Video" IEEE Int. Workshop on Multimedia Signal Processing, pp. 109-112, Dec. 2002.

Moschetti et al., "New Dictionary and Fast Atom Searching Method for Matching Pursuit Representation of Displaced Frame Difference" IEEE International Conference on Image Processing, pp. III-685-688, Sep. 2002.

Neff et al., "Matching Pursuit Video Coding-Part I: Dictionary Approximation" IEEE Trans Circuits System Video Technology, vol. 12, No. 1, pp. 13-26, Jan. 2002.

Tredwell et al., "A Sequential Vector Selection Algorithm for Controllable Bandwidth Motion Description Encoding" IEEE Sympos. Intell. Multimedia. Video & Speech Process, May 2001.

Czerepinski et al., "Matching Pursuits Video Coding: Dictionaries and Fast Implementation" IEEE Trans Circuit Systems Video Technology, vol. 10, No. 7, pp. 1103-1115, Oct. 2000.

Monro et al., "Visual Embedding of Wavelet Transform Coefficients" IEEE International Conference Image Process, pp. 186-189, Sep. 2000.

Neff et al., "Very Low Bit-Rate Video Coding Based on Matching Pursuits" IEEE Trans. Circuits and Systems for Video Tech., vol. 7, No. 1, pp. 158-171, Feb. 1997.

Mallat et al., "Matching Pursuits with Time-Frequency Dictionaries" IEEE Trans. Signal Processing, vol. 41, No. 12, pp. 3397-3415, Dec. 1993.

Steffen et al., "Theory of Regular $M$-band Wavelet Bases" IEEE Transactions on Signal Processing, vol. 41, No. 12, pp. 3497-3511, Dec. 1993.

Shapiro, "Embedded Image Coding Using Zerotrees of Wavelet Coefficients" IEEE Transactions on Signal Processing, vol. 41, No. 12, pp. 3445-3462, Dec. 1993.

Ramchandran et al., "Best Wavelet Packet Bases in a Rate-Distortion Sense" IEEE Transactions on Signal Processing, vol. 2, No. 2, pp. 160-175, Apr. 1993.

Mallat, "A Theory for Multiresolution Signal Decomposition: The Wavelet Representation" IEEE Trans. Pattern Anal. Mach. Intel., vol. 11, No. 7, Jul. 1989.

Daubechies, "Orthonormal Bases of Compactly Supported Wavelets" Comm. Pure Appl. Math., vol. 41, pp. 909-996, 1988.

R. Neff, A. Zakhor, and M. Vetterli, "Very low bit rate video coding using matching pursuits," Proc. SPIE Conf. on Visual Communication and Image Processing Chicago, IL, vol. 2308, pp. 47-60, Sep. 1994, 14 pages.

R. Neff and A. Zakhor, "Matching pursuit video coding at very low bit rates," IEEE Data Compression Conference, Mar. 1995, pp. 411-420, 10 pages.

Chou, Y., Hwang, W., and Huang, C. 2003. Gain-shape optimized dictionary for matching pursuit video coding. Signal Process. 83, 9 (Sep. 2003), 1937-1743, 7 pages.

Chan et al., "Multiple Description and Matching Pursuit Coding For Video Transmission Over the Internet," IEEE International Conference on Acoustics, Speech, and Signal Processing, Apr. 2003, vol. 3, pp. 425-428.

* cited by examiner

500

| 11 | 12 | . . . | 1m |
| --- | --- | --- | --- |
| 21 | 22 | . . . | 2m |
| . . . | . . . | . | . |
| m1 | m2 | . . . | mm |

Figure 5c

REDUCED DIMENSION WAVELET MATCHING PURSUITS CODING AND DECODING

FIELD

This application pertains to the field of coding and/or decoding data including, for example, images, and more particularly, to the field of coding and/or decoding data using wavelet transforms and/or matching pursuits.

BACKGROUND

Digital video services such as transmitting digital video information over wireless transmission networks, digital satellite services, streaming video over the internet, delivering video content to personal digital assistants or cellular phones, etc., are increasing in popularity. Increasingly, digital video compression and decompression techniques may be implemented that balance visual fidelity with compression levels to allow efficient transmission and storage of digital video content.

BRIEF DESCRIPTION OF THE DRAWINGS

The claimed subject matter will be understood more fully from the detailed description given below and from the accompanying drawings of embodiments which should not be taken to limit the claimed subject matter to the specific embodiments described, but are for explanation and understanding only.

FIG. 5c is a diagram depicting an image that has undergone decomposition in a horizontal direction and a vertical direction yielding m*m frequency bands.

DETAILED DESCRIPTION

Figure 1:
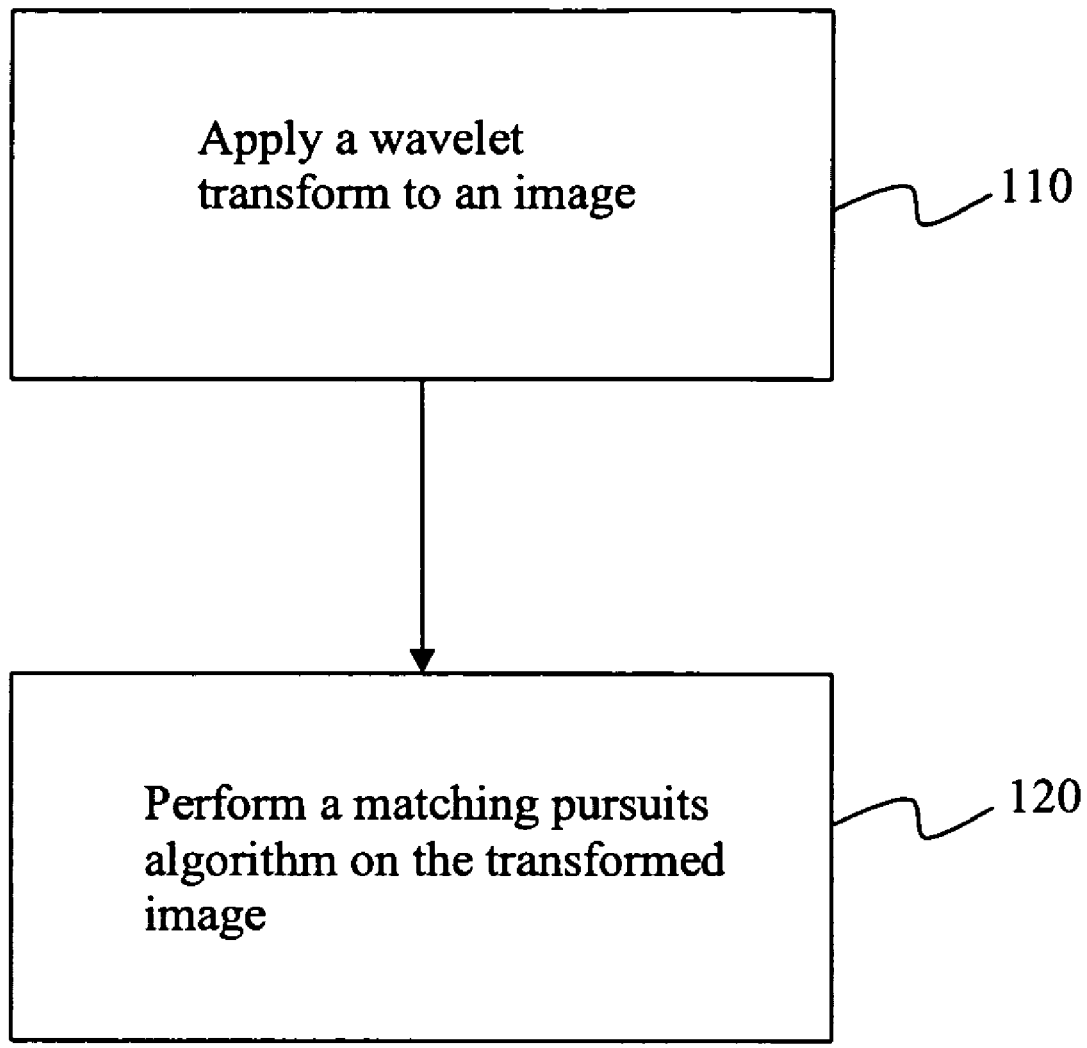
FIG. 1 is a flow diagram of one embodiment of a method for coding an image.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

A process and/or algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore the term "and/or" may mean "and", it may mean "or", it may mean "exclusive-or", it may mean "one", it may mean "some, but not all", and/or it may mean "both."

Matching pursuits algorithms may be used to compress digital images. A matching pursuit algorithm may include finding a full inner product between a signal to be coded and each member of a dictionary of basis functions. At the position of the maximum inner product the dictionary entry giving the maximum inner product may describe the signal locally. This may be referred to as an "atom." The amplitude is quantized, and the position, quantized amplitude, sign, and dictionary number form a code describing the atom. For one embodiment, the quantization may be performed using a precision limited quantization method. Other embodiments may use other quantization techniques.

The atom is subtracted from the signal giving a residual. The signal may then be completely, or nearly completely, described by the atom plus the residual. The process may be repeated with new atoms successively found and subtracted from the residual. At any stage, the signal may be completely, or nearly completely, described by the codes of the atoms found and the remaining residual.

Matching pursuits may decompose any signal $f$ into a linear expansion of waveforms that may belong to a redundant dictionary $D=\phi\{\gamma\}$ of basis functions, such that $$f = \sum_{n=0}^{m-1} \alpha_n \varphi_{\gamma_n} + R^m f$$

where $R^m f$ is the $m^{th}$ order residual vector after approximating $f$ by m 'atoms' and $$\alpha_n = \langle \phi_{\gamma_n}, R^n f \rangle$$

is the maximum inner product at stage n of the dictionary with the $n^{th}$ order residual.

For some embodiments, the dictionary of basis functions may comprise two-dimensional bases. Other embodiments may use dictionaries comprising one-dimensional bases which may be applied separately to form two-dimensional bases. A dictionary of n basis functions in one dimension may provide a dictionary of $n^2$ basis functions in two dimensions. For one embodiment, two-dimensional data, such as image data, may be scanned to form a one dimensional signal and a one-dimensional dictionary may be applied. In other embodiments, a one-dimensional dictionary may be applied to other one-dimensional signals, such as, for example, audio signals.

For compression, the matching pursuits process may be terminated at some stage and the codes of a determined number of atoms are stored and/or transmitted by a further coding process. For one embodiment, the further coding process may be a lossless coding process. Other embodiments may use other coding techniques, for example lossy processes.

An image may be represented as a two-dimensional array of coefficients, each coefficient representing luminance levels at a point. Many images have smooth luminance variations, with the fine details being represented as sharp edges in between the smooth variations. The smooth variations in luminance may be termed as lower frequency components and the sharp variations as higher frequency components. The lower frequency components (smooth variations) may comprise the gross information for an image, and the higher frequency components may include information to add detail to the gross information. One technique for separating the lower frequency components from the higher frequency components may include a Discrete Wavelet Transform (DWT). Wavelet transforms may be used to decompose images. Wavelet decomposition may include the application of Finite Impulse Response (FIR) filters to separate image data into sub sampled frequency bands. The application of the FIR filters may occur in an iterative fashion, for example as described below in connection with FIGS. 4a through 4d.

FIG. 1 is a flow diagram of one embodiment of a method for coding an image. At block 110, a wavelet transform is applied to an image. At block 120, a matching pursuits algorithm is performed on the transformed image. The combination of the wavelet transform and the matching pursuits algorithm has an intended advantage of yielding a highly efficient compression of the image data. The example embodiment of FIG. 1 may include all, more than all, and/or less than all of blocks 110-120, and furthermore the order of blocks 110-120 is merely an example order, and the scope of the claimed subject matter is not limited in this respect. Further, although the example embodiments described herein discuss images, other embodiments are possible applying wavelet transformation and matching pursuits on other types of data, including, but not limited to, audio signals and other multidimensional data.

Figure 2:
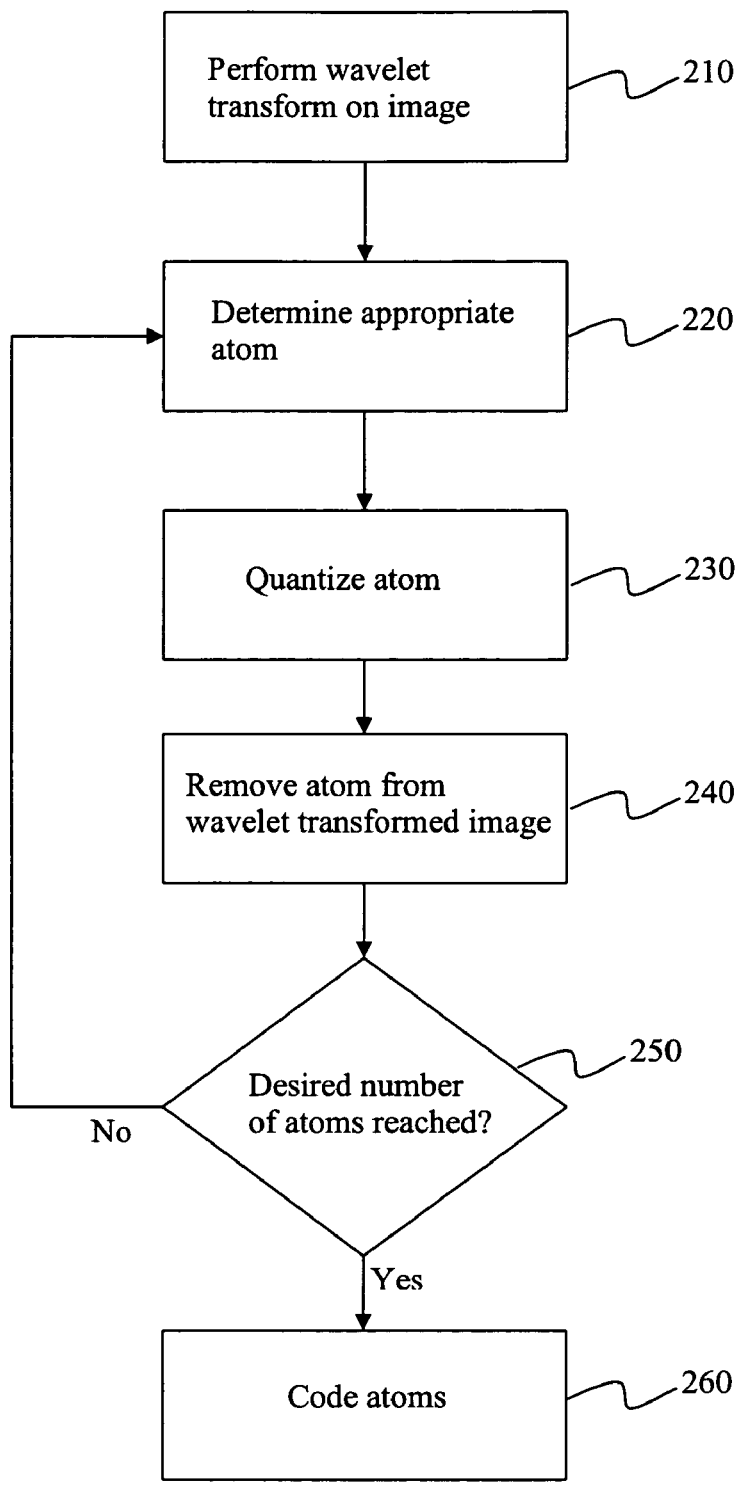
FIG. 2 is a flow diagram of one embodiment of a method for coding an image using a wavelet transform and matching pursuits.

FIG. 2 is a flow diagram of one embodiment of a method for coding an image using a wavelet transform and matching pursuits. At block 210, a wavelet transform is performed on an image. The image may comprise a still image (or intra-frame), a motion-compensated residual image (Displaced Frame Difference (DFD) image, or inter-frame), or other type of image. The wavelet transform for this example embodiment may comprise a two-dimensional analysis, although the claimed subject matter is not limited in this respect. The analysis or decomposition may be carried out for some embodiments a number of times, yielding a hierarchical structure of bands. Wavelet transformation is discussed further below in connection with FIGS. 4a through 7.

At block 220, a matching pursuits algorithm begins. For this example embodiment, the matching pursuits algorithm comprises blocks 220 through 250. At block 220, an appropriate atom is determined. The appropriate atom may be determined by finding the full inner product between the wavelet transformed image data and each member of a dictionary of basis functions. At the position of maximum inner product the corresponding dictionary entry describes the wavelet transformed image data locally. The dictionary entry forms part of the atom. An atom may comprise a position value, a quantized amplitude, sing, and a dictionary entry value. The quantization of the atom is shown at block 230.

At block 240, the atom determined at block 220 and quantized at block 230 is removed from the wavelet transformed image data, producing a residual. The wavelet transformed image may be described by the atom and the residual.

At block 250, a determination is made as to whether a desired number of atoms has been reached. The desired number of atoms may be based on any of a range of considerations, including, but not limited to, image quality and bit rate. If the desired number of atoms has not been reached, processing returns to block 220 where another atom is determined. The process of selecting an appropriate atom may include finding the full inner product between the residual of the wavelet transformed image after the removal of the prior atom and the members of the dictionary of basis functions. In another embodiment, rather than recalculating all of the inner products, the inner products from a region of the residual surrounding the previous atom position may be calculated. Blocks 220 through 250 may be repeated until the desired number of atoms has been reached. Once the desired number of atoms has been reached, the atoms are coded at block 260. The atoms may be coded by any of a wide range of encoding techniques. The example embodiment of FIG. 2 may include all, more than all, and/or less than all of blocks 210-260, and furthermore the order of blocks 210-260 is merely an example order, and the scope of the claimed subject matter is not limited in this respect.

Figure 3:
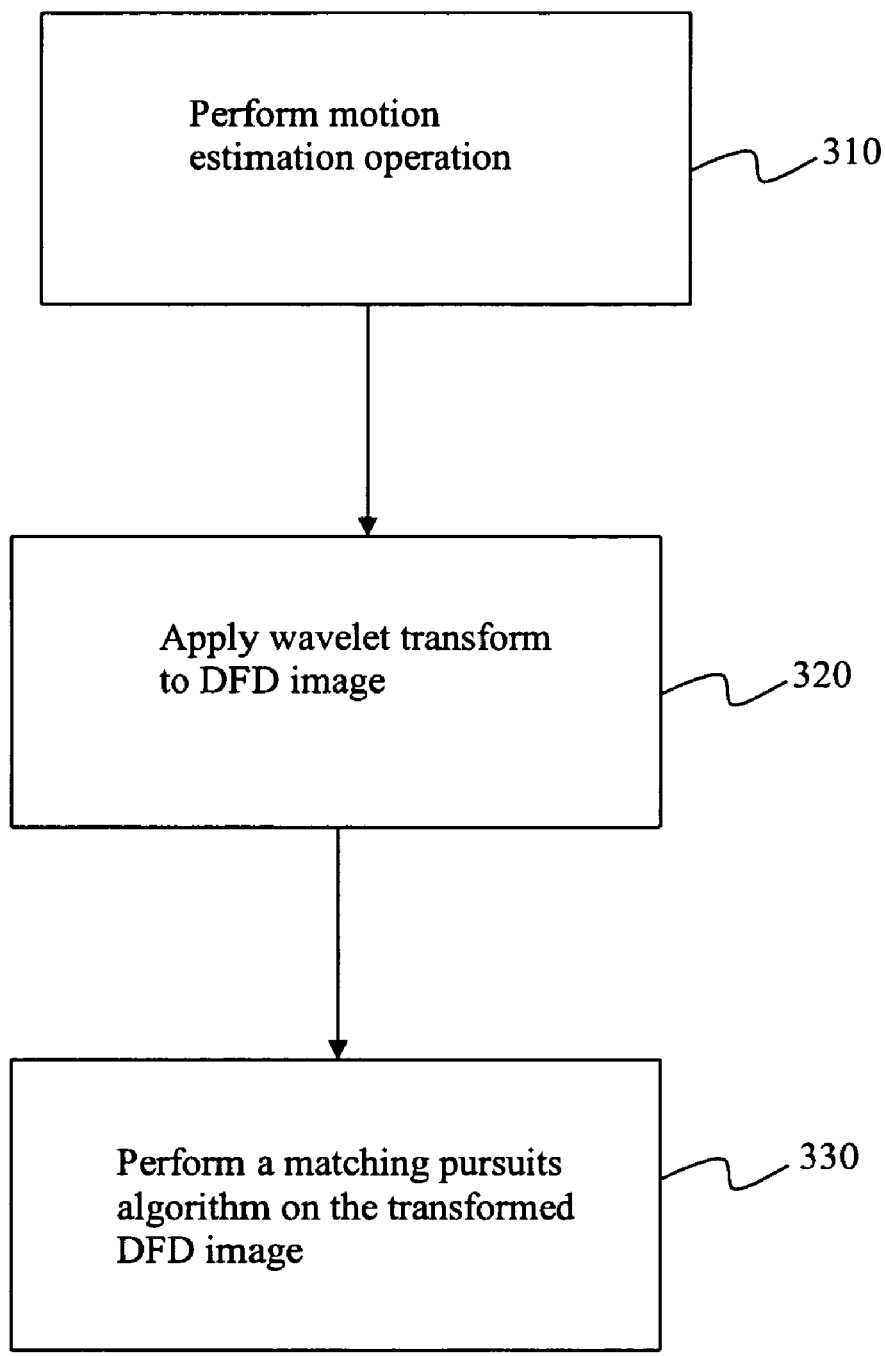
FIG. 3 is a flow diagram of one embodiment of a method for coding an image using motion compensation, wavelet transform, and matching pursuits.

FIG. 3 is a flow diagram of one embodiment of a method for coding an image using motion estimation, wavelet transform, and matching pursuits. At block 310, a motion estimation operation is performed, producing a DFD image. At block 320, a wavelet transform is applied to the DFD image. At block 330, a matching pursuits algorithm is performed on the wavelet transformed DFD image. The example embodiment of FIG. 3 may include all, more than all, and/or less than all of blocks 310-330, and furthermore the order of blocks 310-330 is merely an example order, and the scope of the claimed subject matter is not limited in this respect.

Figure 4A:
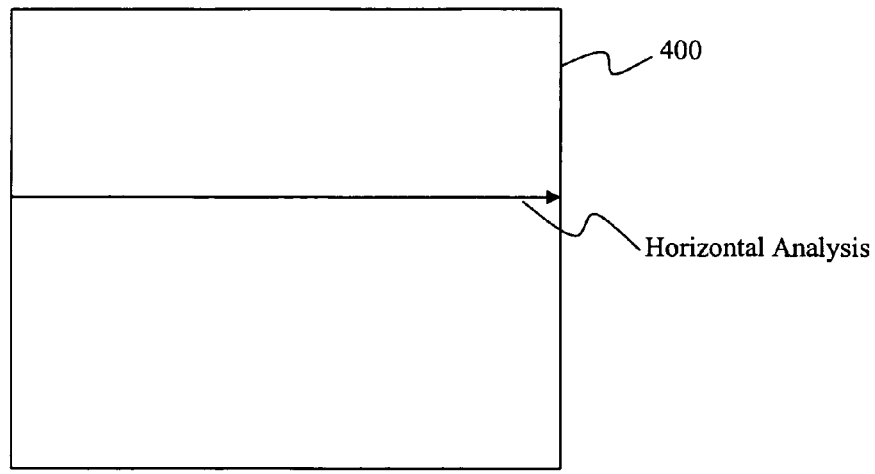
FIG. 4a is a diagram depicting an example decomposition of an image in a horizontal direction.
Figure 4B:
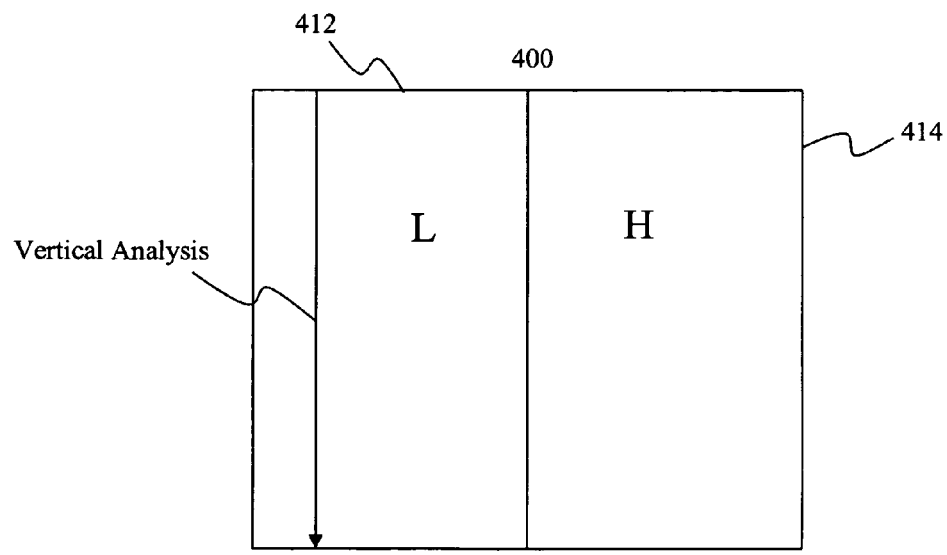
FIG. 4b is a diagram depicting an image that has been decomposed in a horizontal direction and is undergoing decomposition in a vertical direction.

FIGS. 4a through 4d is a diagram depicting an example wavelet decomposition of an image 400. As depicted in FIG. 4a, for this example embodiment, the analysis begins in a horizontal direction. Other embodiments may begin the analysis in a vertical direction, or in another direction. The horizontal analysis results in the image data being subdivided into two sub bands. The resulting low pass band (containing lower frequency image information) is depicted as area 412 in FIG. 4b and the high pass sub band (containing higher frequency image information) is depicted as area 414. Also as depicted in FIG. 4b, an analysis is performed in a vertical direction on image 400.

Figure 4C:
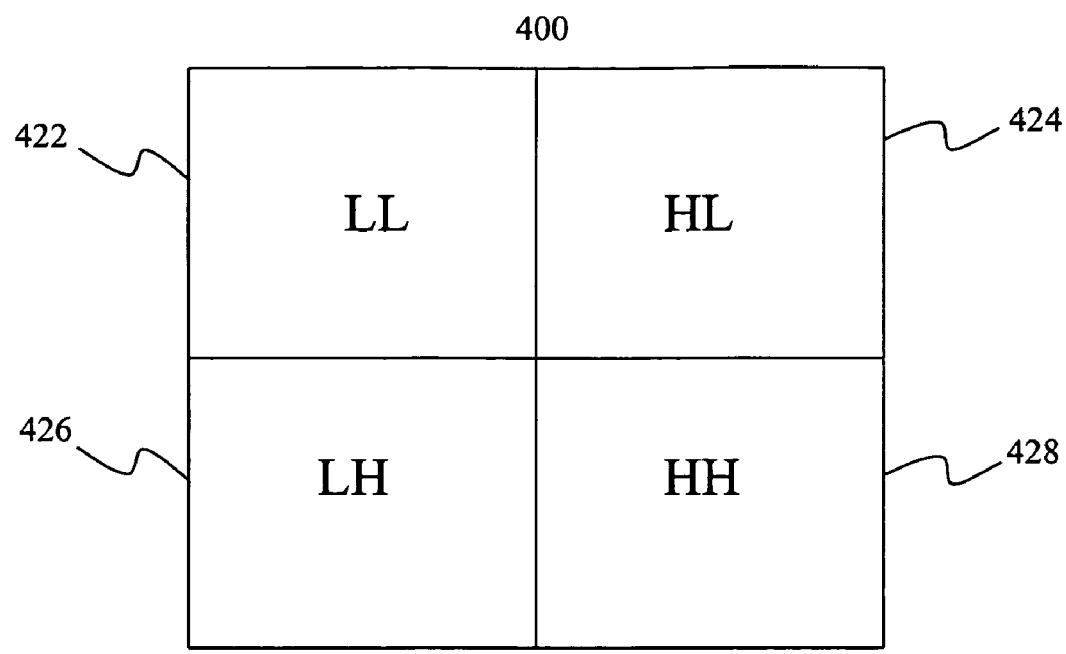
FIG. 4c is a diagram depicting an image that has been decomposed into four frequency bands.

FIG. 4c shows the results of the horizontal and vertical analyses. Image 400 is divided into four sub bands. LL sub band 422 includes data that has been low passed filtered in both the horizontal and vertical directions. HL sub band 424 includes data that has been high pass filtered in the horizontal direction and low pass filtered in the vertical direction. LH sub band 426 includes data that has been low pass filtered in the horizontal direction and high pass filtered in the vertical direction. HH sub band 428 includes data that has been high pass filtered in both the horizontal and vertical directions. LL sub band 422 may include gross image information, and bands HL 424, LH 426, and HH 428 may include high frequency information providing additional image detail.

Figure 4D:
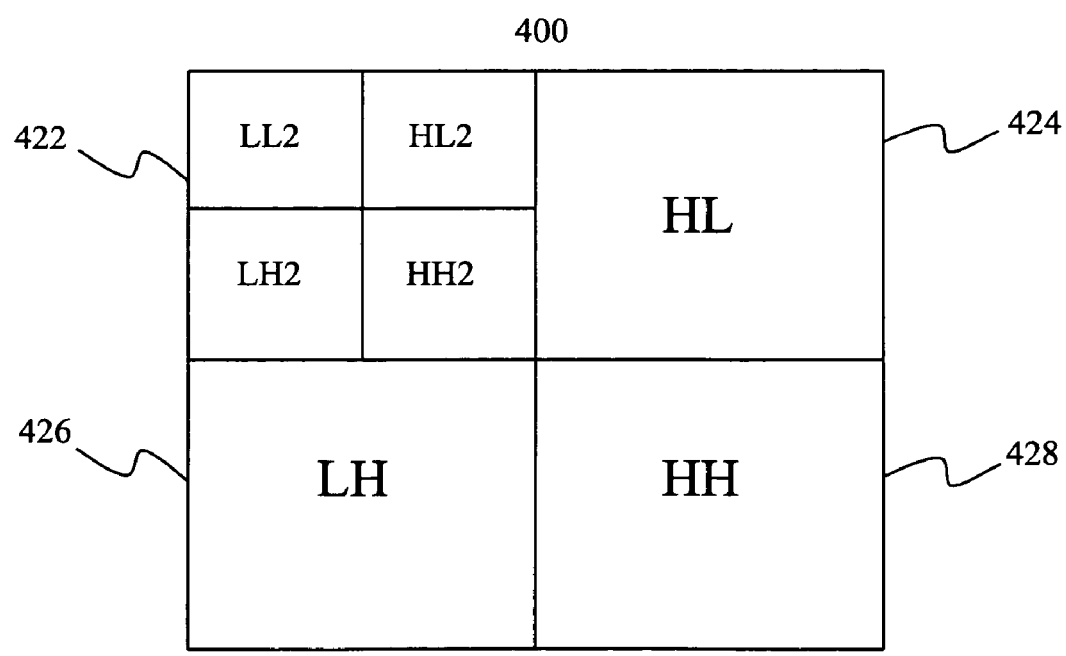
FIG. 4d is a diagram depicting an image that has been decomposed into four frequency bands where one of the bands has been decomposed into four additional bands.

For wavelet transformation, benefits may be obtained by repeating the decomposition process one or more times. For example, LL band 422 may be further decomposed to produce another level of sub bands LL2, HL2, LH2, and HH2, as depicted in FIG. 4d. Each level of decomposition may be referred to as a wavelet scale. Thus, image 400 of FIG. 4d can be said to have undergone wavelet transformation over two scales. Other embodiments may include wavelet transformation over different numbers of scales. For example, in one embodiment, for still images or intra-frames a wavelet transformation may be performed over five scales and for DFD images a wavelet transformation may be performed over two scales.

Figure 5A:
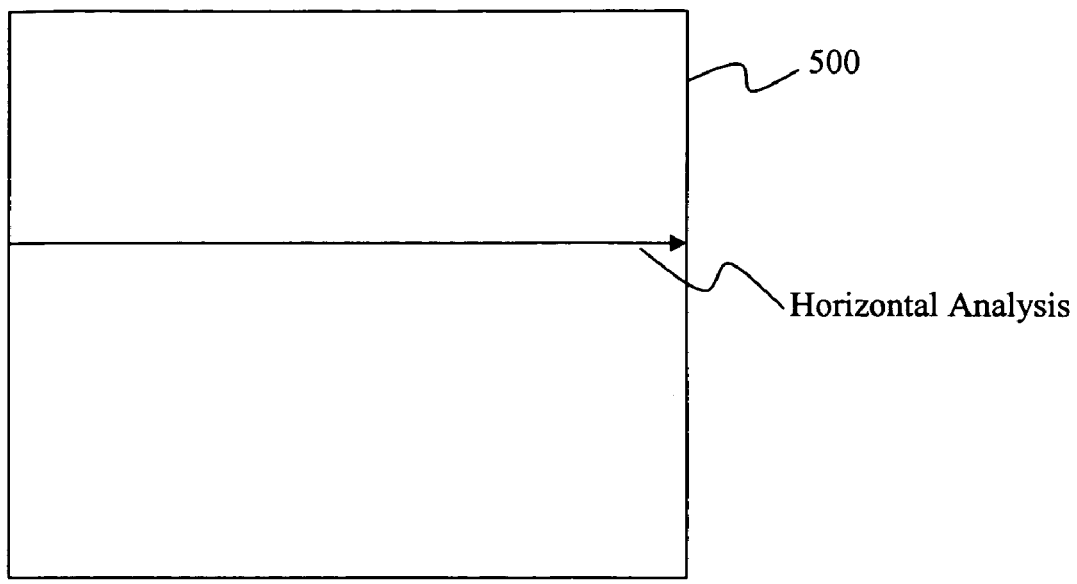
FIG. 5a is a diagram depicting an example decomposition of an image in a horizontal direction.
Figure 5B:
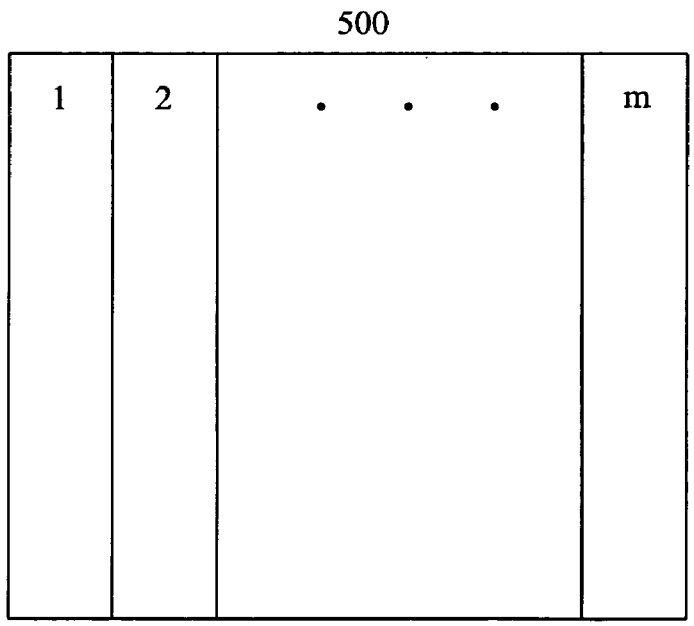
FIG. 5b is a diagram depicting an image that has undergone decomposition in a horizontal direction yielding "m" frequency bands.
Figure 5C:
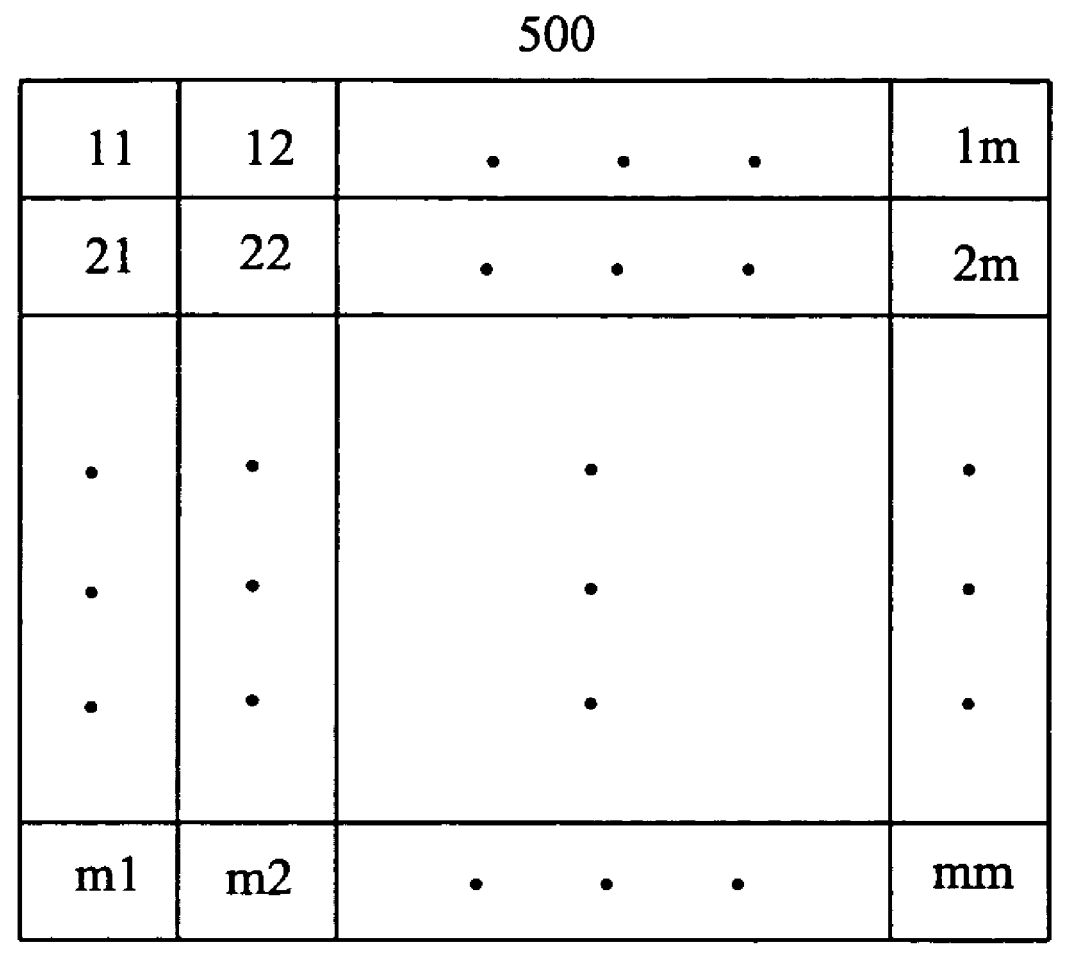

FIGS. 4a through 4d depict an example two band (low and high) wavelet transformation process. Other embodiments are possible using more than two bands. FIGS. 5a through 5c depict an "m" band transformation process. For this example embodiment, and as shown in FIG. 5a, an analysis of an image 500 begins in a horizontal direction. FIG. 5b shows that image 500 has been sub divided into "m" bands. For this example, band 1 includes the lowest, or at least relatively lowest, frequency image components as analyzed in the horizontal direction and band m includes the highest, or at least relatively highest, frequency image components.

Following the horizontal analysis, the analysis is performed in a vertical direction. FIG. 5c depicts the results of the "m" band analysis after both the horizontal and vertical analyses are performed. Data for image 500 is separated into m*m sub bands. For this example embodiment, sub band 11 includes the lowest, or at least relatively lowest, frequency image components an sub band mm includes the highest, or at least relatively highest, frequency image components.

Although the example embodiment discussed in connection with FIGS. 5a through 5c utilize a single wavelet scale, other embodiments are possible where one or more of the sub bands are transformed over more than one scale.

Figures 6A, 6B:
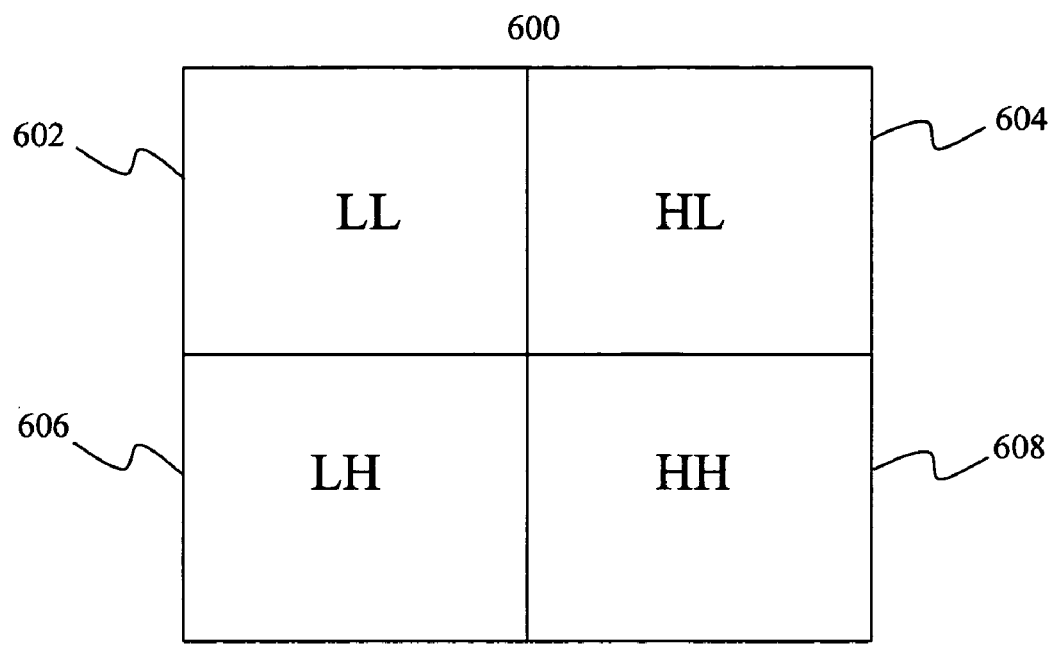
FIG. 6a is a diagram depicting an image that has been decomposed into four frequency bands.
FIG. 6b is a diagram depicting the image of FIG. 6a where the four frequency bands have each been decomposed into four frequency bands.

Another possible embodiment for wavelet transformation may be referred to as wavelet packets. FIGS. 6a and 6b depict one possibility for wavelet packets. In FIG. 6a, an image 600 has undergone a single scale of two band decomposition in a manner similar to that discussed above in connection with FIGS. 4a through 4c, yielding LL sub band 602, HL sub band 604, LH sub band 606, and HH sub band 608. For this example embodiment, each of the sub bands 602 through 608 are further decomposed into four sub bands, as depicted in FIG. 6b. LL sub band 602 is decomposed into sub bands LLLL, LLHL, LLLH, and LLHH. HL sub band 604 is decomposed into sub bands HLLL, HLHL, HLLH, and HLHH. LH sub band 606 is decomposed into sub bands LHLL, LHHL, LHLH, and LHHH. HH sub band 608 is decomposed into sub bands HHLL, HHHL, HHLH, and HHHH. For some embodiments, any of all of the sub bands depicted in FIG. 6b may be further decomposed into additional levels of sub bands. Further, although the example embodiment of FIGS. 6a and 6b utilize two band decomposition, other embodiments may use additional numbers of bands.

Figure 7:
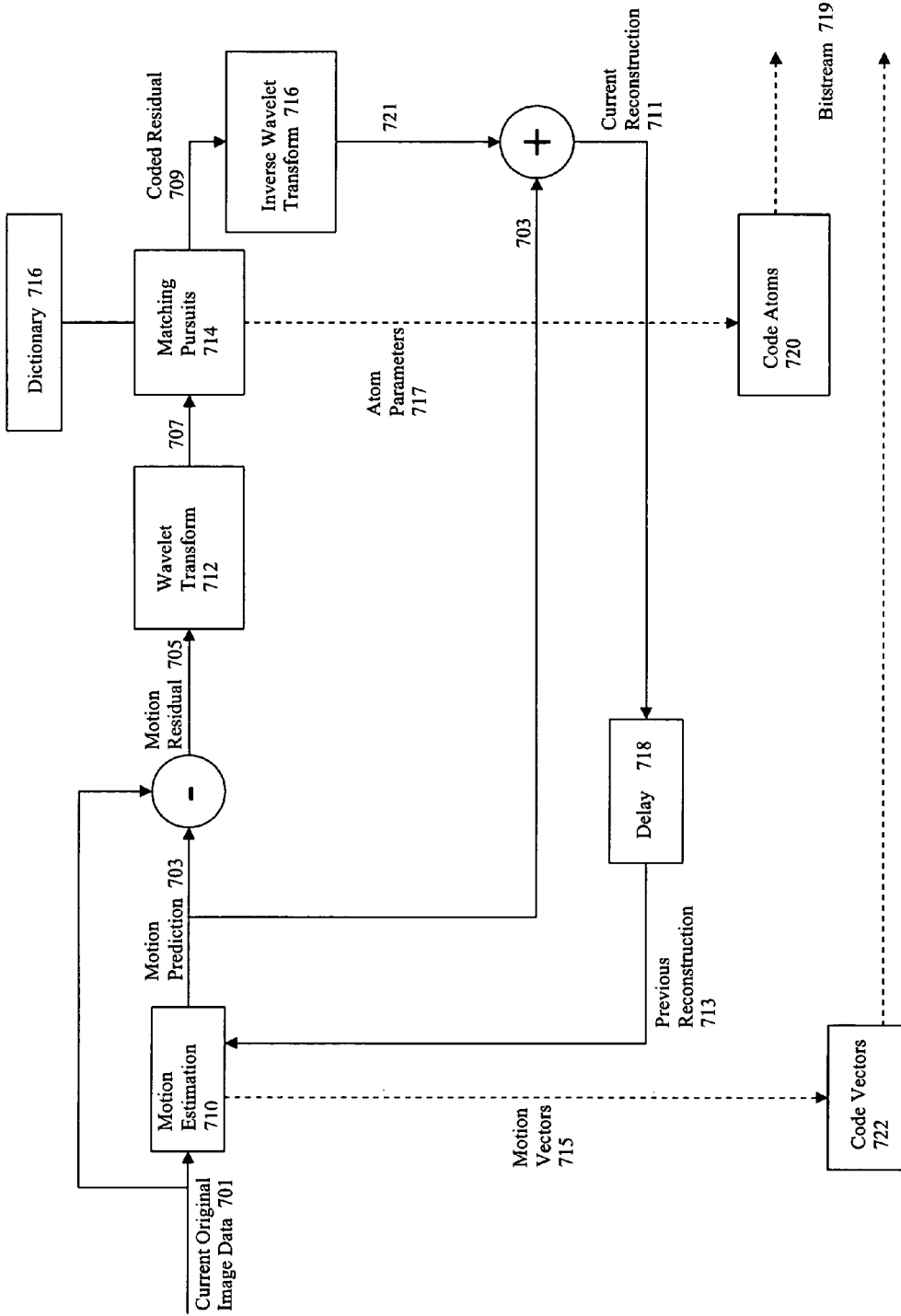
FIG. 7 is a block diagram of one embodiment of an example coding system.

FIG. 7 is a block diagram of one embodiment of an example video coding system 700. Coding system 700 may be included in any of a wide range of electronic devices, including digital cameras or other image forming devices, although the claimed subject matter is not limited in this respect. Coding system 700 may receive data 701 for a current original image. For this example embodiment, the current original image may be a frame from a digital video stream. For this example embodiment, the current original image data is processed by a motion estimation block 710. Motion estimation block 710 may produce motion vectors 715 which may be encoded by a code vectors block 722. Motion prediction data 703 may be subtracted from the current original image data 701 to form a motion residual 705. The motion residual may be a DFD image.

Motion residual 705 is received at a wavelet transform block 712. Wavelet transform block 712 may perform a wavelet transform on motion residual 705. The wavelet transform may be similar to one or more of the example embodiments discussed above in connection with FIGS. 4a through 6b, although the claimed subject matter is not limited in this respect.

The output 707 of wavelet transform block 712 may be transferred to a matching pursuits block 714. Matching pursuits block 714 may perform a matching pursuits algorithm on the information 707 output from the wavelet transform block 712. The matching pursuits algorithm may be implemented in a manner similar to that discussed above in connection with FIG. 2, although the claimed subject matter is not limited in this respect. The matching pursuits algorithm may use a dictionary 716 to construct a series of atom parameters 717 which are delivered to a code atoms block 720. Code atoms block 720 may encode the atom parameters using any of a wide range of encoding techniques. Also output from matching pursuits block 714 is a coded residual 709 that is delivered to an inverse wavelet transform block 716 that produces an output 721 that is added to motion prediction information 703 to form a current reconstruction 711 corresponding to the current image data. The current reconstruction 711 is delivered to a delay block 718, and then provided to motion estimation block 710 to be used in connection with motion estimation operations for a next original image.

The coded atoms from block 720 and coded motion vectors from block 722 may be output as part of a bitstream 719. Bitstream 719 may be transmitted to any of a wide range of devices using any of a wide range of interconnect technologies, including wireless interconnect technologies, the Internet, local area networks, etc., although the claimed subject matter is not limited in this respect.

Figure 8:
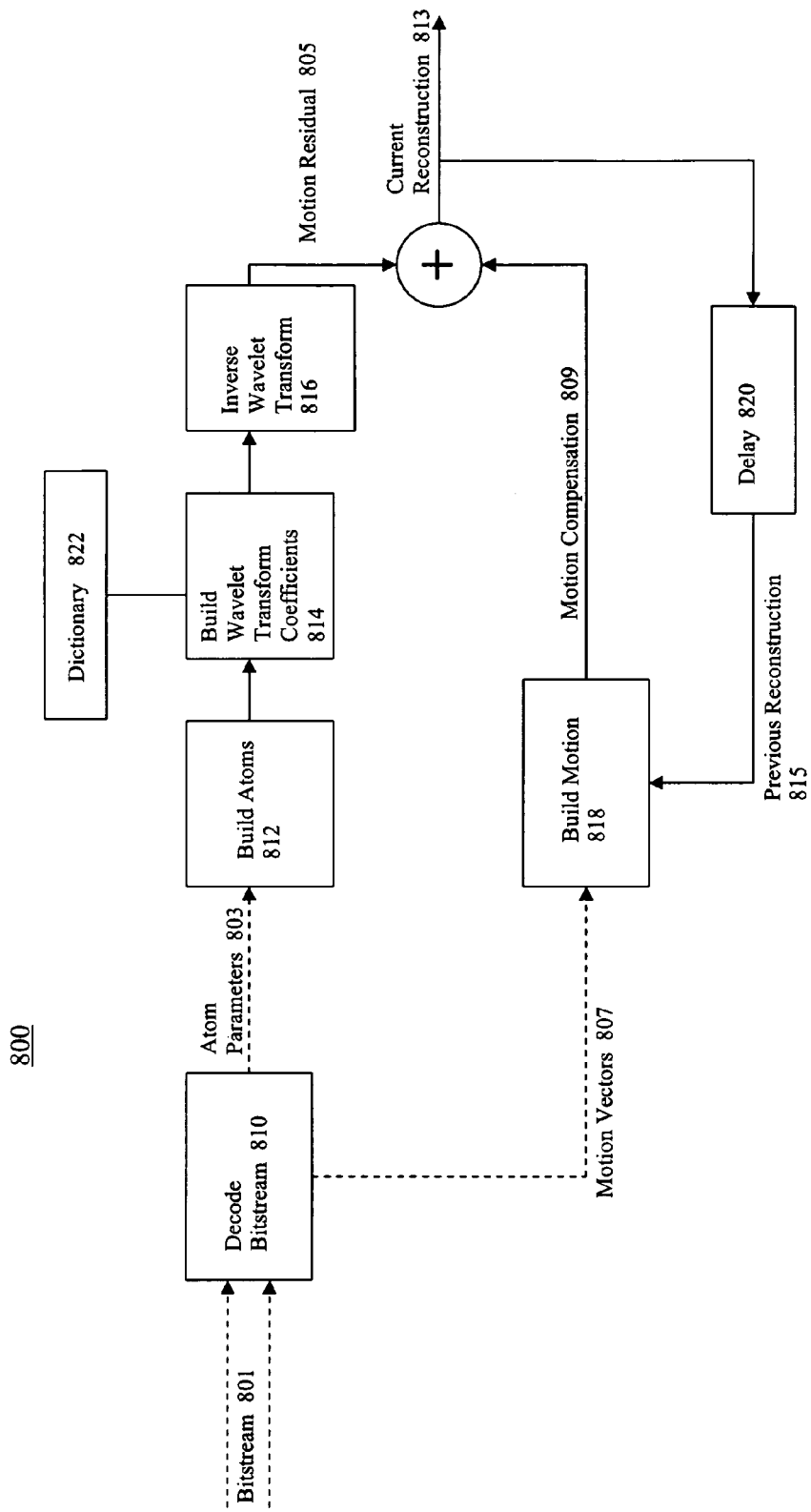
FIG. 8 is a block diagram of one embodiment of an example decoding system.

The various blocks and units of coding system 700 may be implemented using software, firmware, and/or hardware, or any combination of software, firmware, and hardware. Further, although FIG. 8 depicts an example system having a particular configuration of components, other embodiments are possible using other configurations. Also, although example system 700 includes motion estimation processing prior to the wavelet transformation and matching pursuits processing, other embodiments are possible without motion estimation.

FIG. 8 is a block diagram of one embodiment of an example decoding system 800. Decoding system 800 may be included in any of a wide range of electronic devices, including cellular phones, computer systems, or other image viewing devices, although the claimed subject matter is not limited in this respect. A decode bitstream block 810 may receive a bitstream 810 which may comprise coded motion vector information as well as coded atom parameters from a matching pursuit operation. Decode bitstream block 810 provides decoded atom parameters 803 to a build atoms block 812 and also provides decoded motion vectors to a build motion block 818.

Build atoms block 812 receives coded atom parameters 803 and provides decoded atom parameters to a build wavelet transform coefficients block 814. Block 814 uses the atom parameter information and dictionary 822 to reconstruct a series of wavelet transform coefficients. The coefficients are delivered to an inverse wavelet transform block 816 where a motion residual image 805 is formed. The motion residual image may comprise a DFD image. Build motion block 818 receives motion vectors 807 and creates motion compensation data 809 that is added to motion residual 805 to form a current reconstruction image 813. Image data 813 is provided to a delay block 820 which provides a previous reconstruction image 815 to the build motion block 818 to be used in the construction of motion prediction information.

The various blocks and units of decoding system 800 may be implemented using software, firmware, and/or hardware, or any combination of software, firmware, and hardware. Further, although FIG. 8 depicts an example system having a particular configuration of components, other embodiments are possible using other configurations. Also, although example system 800 includes motion compensation processing, other embodiments are possible without motion compensation.

Figure 9:
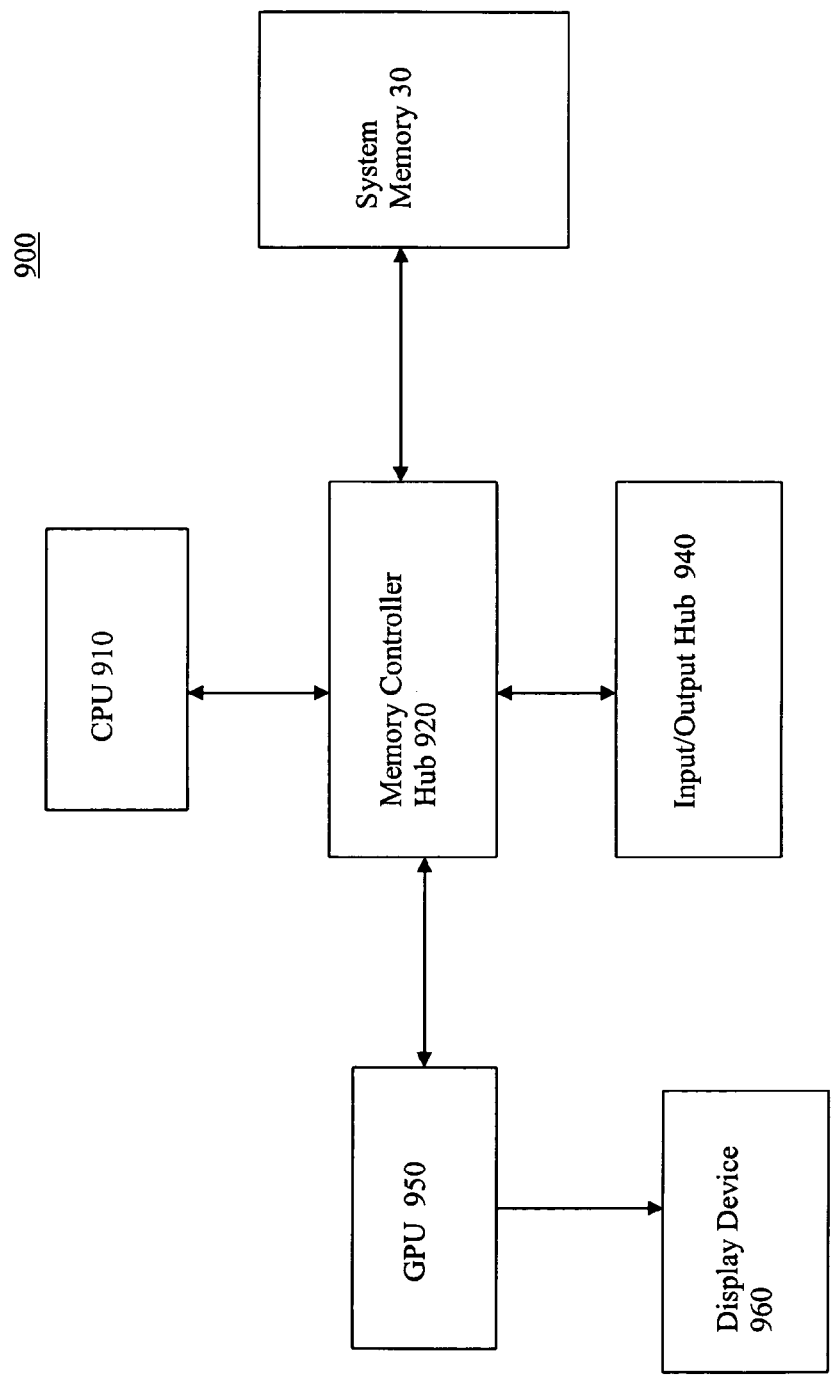
FIG. 9 is a block diagram of one embodiment of an example computer system.

FIG. 9 is a block diagram of an example computer system 900. System 900 may be used to perform some or all of the various functions discussed above in connection with FIGS. 1-8. System 900 includes a central processing unit (CPU) 910 and a memory controller hub 920 coupled to CPU 910. Memory controller hub 920 is further coupled to a system memory 930, to a graphics processing unit (GPU) 950, and to an input/output hub 940. GPU 950 is further coupled to a display device 960, which may comprise a CRT display, a flat panel LCD display, or other type of display device. Although example system 900 is shown with a particular configuration of components, other embodiments are possible using any of a wide range of configurations.

As discussed previously, for at least some embodiments of the matching pursuits algorithm, once a basis function has been subtracted from a signal, a residual signal results. In order to more efficiently recalculate the inner products, some embodiments may recalculate the inner products for a region surrounding the location where the basis function was subtracted. The recalculation of inner products for a region surrounding a location where a basis function was subtracted may be referred to as a "repair" function.

Figure 10A:
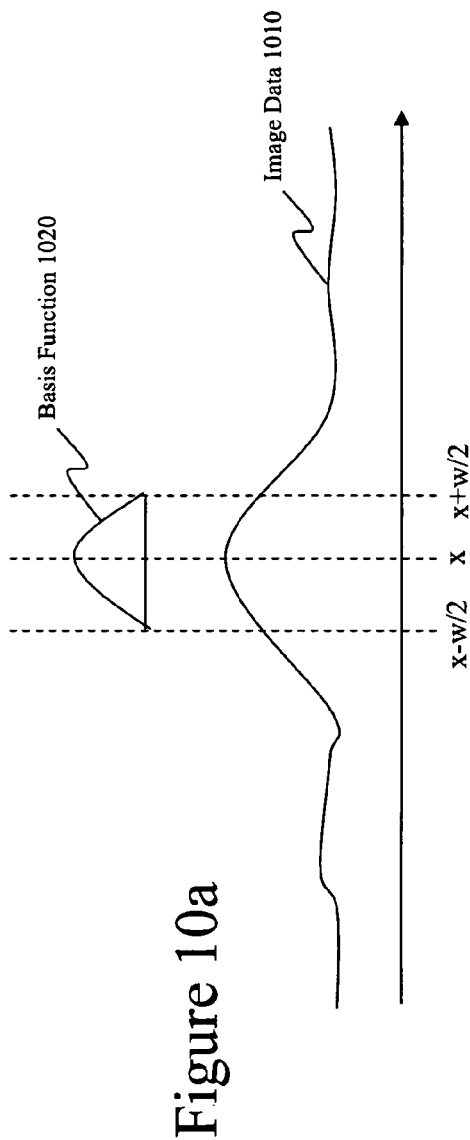
FIG. 10a is a diagram of an example basis function and an example signal.

FIG. 10a is a diagram of an example basis function 1020 and an example image data signal 1010. For this example, basis function 1020 has a width that is equal to the maximum width "w" for entries of an associated dictionary. For this example, a matching pursuits method determines that basis function 1020 at location "x" provides the maximum inner product. As can be seen in FIG. 10a, basis function 1020 for this example spans a region of x−w/2 to x+w/2.

Figure 10B:
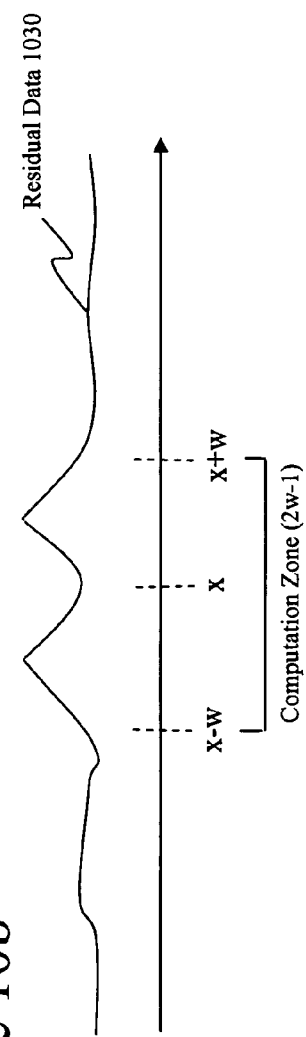
FIG. 10b is a diagram of an example residual signal.

FIG. 10b depicts a residual data signal 1030. Residual signal 1030 for this example is the result of subtracting basis function 1020 from signal 1010. For one embodiment, rather that recalculating all of the inner products for residual signal 1030, the inner products may be repaired; that is a subset of inner products are calculated for a region surrounding the location where basis function 1020 was subtracted. For this example, inner products for a region of x−w to x+w are calculated. Thus, the computation zone for this example has a with of 2w−1.

The computational costs for matching pursuits methods may be dominated by the calculation of inner products, either over an entire image (or other data type) or in the "repair" stage for some embodiments. The calculation of inner products may be much more complex and computation intensive for multi-dimensional dictionaries (or one dimensional dictionaries that are composed separately into two dimensional dictionaries) than for one dimensional dictionaries. For example, if a dictionary consists of N one dimensional basis functions of a maximum width W, then there are $N^2$ two dimensional dictionary entries and the largest entry covers $W^2$ pixels (in the case of a two-dimensional image). In order to perform a repair process, many inner products, some of $W^2$ multiplications followed by summation operations may have to be found over a range of 2W−1 pixels both horizontally and vertically to cover the range whose inner products may have changed by the subtraction of the quantized atom for the image or its residual (for example, the subtraction of basis function 1020 from signal 1010 in FIGS. 10a and 10b). This may be done for every atom or for nearly every atom found to ensure that the maximum inner product is selected for the next atom. The number of multiplications for each or nearly each atom found may therefore be on the order of $N^2W^2(2W+2W-2)$, which may scale with N and W as $4N^2W^3$.

For one embodiment, the computational complexity for coding a multi-dimensional signal such as an image may be reduced by the use of one dimensional basis functions in conjunction with a method for scanning the multi-dimensional image to produce a one dimensional signal. In applying a matching pursuits method to a one dimensional signal, with N one dimensional dictionary entries of a maximum width of W, a repair stage may involve inner products of W multiplications carried out over a range of 2W−1 positions of the signal. The number of multiplications found for each atom found therefore may scale as $2NW^2$ which may be much less complex than the above-described two dimensional case by virtue of both a smaller dictionary and/or the smaller number of multiplications in each inner product.

Figure 11:
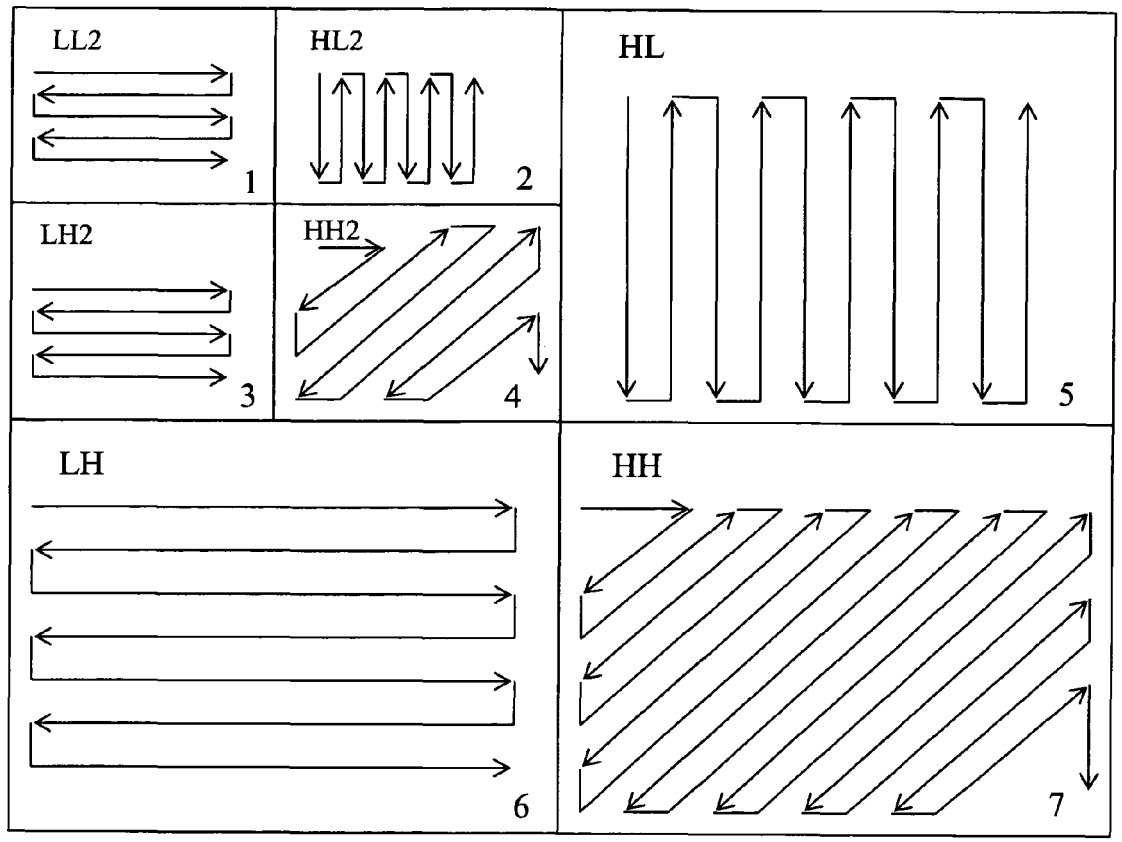
FIG. 11 is a diagram of an example scanning pattern of a two dimensional signal.

FIG. 11 is one example of a scanning pattern for a two-dimensional signal such as an image. For this example, the image of FIG. 11 has previously undergone a wavelet transform over two scales, yielding sub bands LL2, HL2, LH2, HH2, HL, LH, and HH. For this example embodiment, the sub bands are scanned in the order indicated of LL2, HL2, LH2, HH2, HL, LH, and then HH. Also for this example embedment, for sub bands LL2, LH2, and LH, the scan may occur in a horizontal fashion. For sub bands, HL2, and HL, a vertical scan may be performed. For sub bands HH2, and HH, a diagonal scan may be performed. In this manner, the two dimensional data of the image of FIG. 11 may be fashioned into a one dimensional signal. The scanning patterns and order of scanning depicted in FIG. 11 are merely examples, and any of a wide range of scanning techniques may be utilized. Further, although the embodiment of FIG. 11 depicts a two dimensional signal, other embodiments may be used for signals of greater than two dimensions.

The above example describes scanning a multi-dimensional signal (in this example a two dimensional image) in order to produce a one dimensional signal to provide for reduced-complexity matching pursuits computations. A decoding device may include a reverse-scanning process to reproduce the greater-dimensional data from the one dimensional data. Thus, a decoding device such as that shown in FIG. 8 may include a reverse-scan unit to reconstruct the greater-dimensional data (in this example, reconstructing two-dimensional image data). A decoding process may include building atoms from received atom parameters, reconstructing wavelet transform coefficients, performing a reverse scanning process, and performing a reverse wavelet transform process. Of course, this is merely one example of a decoding process, and the claimed subject matter is not limited in this respect. Also, although the examples herein describe scanning two-dimensional data to produce one-dimensional signal data, other embodiments are possible where greater-dimensional data are scanned to produce reduced dimensional signal data and reduced dimensional signal data are reverse-scanned to reconstruct greater-dimensional data.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive sense.

What is claimed is:

1. A method performed by a computing system having a processor and memory, the method comprising:
    applying by the computing system a wavelet transform to data to produce transformed data in a plurality of sub bands, wherein the transformed data includes data representing a still image and a displaced frame difference image generated by a motion compensation operation;
    scanning at least two of the sub bands of the transformed data in a predetermined order to produce reduced dimension data, wherein the scanning includes scanning at least a first sub band in a first pattern and scanning at least a second sub band in a second pattern different from the first pattern, the first sub band and the second sub band not overlapping; and
    performing a matching pursuit process on the reduced dimension data.

2. The method of claim 1, wherein applying a wavelet transform to the data includes applying a two-dimensional wavelet transform to the data.

3. The method of claim 2, wherein applying a two dimensional wavelet transform to the data includes using two or more levels of wavelet decomposition.

4. The method of claim 2, wherein the data comprises image data.

5. The method of claim 1, wherein the transformed data comprises two dimensional data and further where scanning the transformed data produces one dimensional data.

6. The method of claim 1, wherein the data comprises multidimensional data.

7. A method, performed by a computing system having a processor and memory, comprising:
    decoding by the computing system a plurality of matching pursuit atom parameters;
    generating a plurality of wavelet transform coefficients from the plurality of atom parameters;
    generating first data based at least in part on a generated wavelet transform coefficient;
    performing a reverse-scanning process on the generated first data to produce greater-dimensional data, wherein the reverse-scanning process comprises:
        reverse-scanning, in a first pattern, a first portion of the first data corresponding to a first sub band, and
        reverse-scanning, in a second pattern, a second portion of the first data corresponding to a second sub band, wherein the first portion and the second portion are not overlapping; and
    performing an inverse wavelet transform on the greater-dimensional data, wherein performing the inverse wavelet transform comprises producing image data wherein the image data comprises data representing a still image and a displaced frame difference image data.

8. The method of claim 7, wherein the greater-dimensional data comprises two-dimensional data.

9. The method of claim 7, wherein performing an inverse wavelet transform includes applying a two-dimensional inverse wavelet transform.

10. An apparatus, comprising:
a component that, when executed, applies a wavelet transform to data to produce transformed data, wherein the transformed data includes data representing a still image and a displaced frame difference image generated by a motion compensation operation and further wherein the transformed data includes a plurality of non-overlapping sub bands;
a component that, when executed, scans the transformed data to produce reduced dimension data including scanning, in a horizontal pattern, a first portion of the transformed data corresponding to a first sub band and scanning, in a vertical pattern, a second portion of the transformed data corresponding to a second sub band; and
a component that, when executed, performs a matching pursuit algorithm on the reduced dimension data.

11. The apparatus of claim 10 further comprising a component that, when executed, applies a two-dimensional wavelet transform to the data.

12. The apparatus of claim 11 further comprising a component that, when executed, applies two levels of wavelet decomposition.

13. The apparatus of claim 11, wherein the data comprises image data.

14. The apparatus of claim 10 further comprising a component that, when executed, produces transformed data comprising two dimensional data and a component configured to scan the transformed data to produce one dimensional data.

15. The apparatus of claim 10, wherein the data comprises multidimensional data.

16. An apparatus, comprising:
a component that, when executed, decodes a plurality of matching pursuit atom parameters;
a component that, when executed, generates a plurality of wavelet transform coefficients from the plurality of atom parameters;
a component that, when executed, generates initial data based at least in part on a generated wavelet transform coefficient, the initial data comprising a plurality of non-overlapping sub band regions;
a component that, when executed, performs a reverse-scanning process on the generated initial data to produce greater-dimensional data at least in part by reverse-scanning a first sub band region according to a first pattern and reverse-scanning a second sub band region according to a second pattern different from the first pattern; and
a component that, when executed, performs an inverse wavelet transform on the greater-dimensional data, wherein the inverse wavelet transform produces image data wherein the image data comprises data representing a still image and a displaced frame difference image data.

17. The apparatus of claim 16, wherein the greater-dimensional data comprises two-dimensional data.

18. The apparatus of claim 16 further comprising a component that, when executed, performs an inverse wavelet transform including applying a two-dimensional inverse wavelet transform.

19. A non-transitory computer-readable storage medium having stored thereon computer-executable instructions, the instructions comprising:
instructions for applying a wavelet transform to data representing one or more images to produce transformed data;
instructions for scanning the transformed data to produce reduced dimension data including instructions for scanning a first portion of the transformed data in a first pattern and instructions for scanning a second portion of the transformed data in a second pattern, wherein the first portion and the second portion are non-overlapping and further wherein the first pattern is different from the second pattern; and
instructions for performing a matching pursuit algorithm on the reduced dimension data, wherein the transformed data includes data representing a still image and a displaced frame difference image generated by a motion compensation operation.

20. The non-transitory computer-readable storage medium of claim 19, wherein the instructions for applying a wavelet transform to the data include instructions for applying a two-dimensional wavelet transform to the data.

21. The non-transitory computer-readable storage medium of claim 20, wherein the instructions for applying a two dimensional wavelet transform to the data include instructions for using two levels of wavelet decomposition.

22. The non-transitory computer-readable storage medium of claim 20, wherein the data comprises image data.

23. The non-transitory computer-readable storage medium of claim 19, wherein the transformed data comprises two dimensional data and further wherein scanning the transformed data produces one dimensional data.

24. The non-transitory computer-readable storage medium of claim 19, wherein the data comprises a displaced frame difference image generated by a motion compensation operation.

25. A non-transitory computer-readable storage medium having stored thereon computer-executable instructions, the instructions comprising:
instructions for decoding a plurality of matching pursuit atom parameters;
instructions for generating a plurality of wavelet transform coefficients from the plurality of atom parameters;
instructions for generating reduced-dimension image data based on at least one of the generated wavelet transform coefficients;
instructions for performing a reverse-scanning process on the reduced-dimension image data to produce greater-dimensional data, the reverse-scanning process including:
reverse-scanning a first sub band region according to a first pattern, and
reverse-scanning a second sub band region according to a second pattern different from the first pattern,
wherein the first sub band region and the second sub band region do not overlap; and
instructions for performing an inverse wavelet transform on the greater-dimensional data, wherein performing the inverse wavelet transform comprises producing image data wherein the image data comprises data representing a still image and a displaced frame difference image data.

26. The non-transitory computer-readable storage medium of claim 25, wherein the greater-dimensional data comprises two-dimensional data.

27. The non-transitory computer-readable storage medium of claim 26, wherein the inverse wavelet transform produces image data.

28. The non-transitory computer-readable storage medium of claim 25, wherein the instructions for performing an inverse wavelet transform include instructions for applying a two-dimensional inverse wavelet transform.

29. An apparatus, comprising:
- means for applying a wavelet transform to data to produce transformed data, wherein the transformed data includes data representing a still image and a displaced frame difference image generated by a motion compensation operation;
- means for scanning a first portion of the transformed data in a horizontal pattern to produce first reduced dimension data;
- means for scanning a second portion of the transformed data in a vertical pattern to produce second reduced dimension data, wherein the first portion and the second portion do not overlap;
- means for scanning a third portion of the transformed data in a diagonal pattern to produce third reduced dimension data, wherein the first and third portions do not overlap, and wherein the second and third portions do not overlap; and
- means for performing a matching pursuit process on the first, second, and third reduced dimension data.

* * * * *

UNITED STATES PATENT AND TRADEMARK OFFICE
CERTIFICATE OF CORRECTION

| | | |
|---|---|---|
| PATENT NO. | : 7,848,584 B2 | Page 1 of 1 |
| APPLICATION NO. | : 11/222665 | |
| DATED | : December 7, 2010 | |
| INVENTOR(S) | : Monro | |

It is certified that error appears in the above-identified patent and that said Letters Patent is hereby corrected as shown below:

Page 2, item (56), under "Other Publications", in Column 1, Line 3, delete "www.http:// and insert -- http://www. --.

Page 2, item (56), under "Other Publications", in Column 2, Line 46, delete "1937-1743," and insert -- 1937-1943,--.

Sheet 11 of 13, Figure 9, Lines 2-3, delete "System Memory 30" and insert -- System Memory 930 --.

Column 3, line 13, delete "Furthermore" and insert -- Furthermore, --.

Column 9, line 6, delete "Was" and insert -- W as --.

Signed and Sealed this
Nineteenth Day of April, 2011

David J. Kappos
*Director of the United States Patent and Trademark Office*